United States Patent [19]

Datta et al.

[11] Patent Number: 4,999,403

[45] Date of Patent: Mar. 12, 1991

[54] GRAFT POLYMERS OF FUNCTIONALIZED ETHYLENE-ALPHA-OLEFIN COPOLYMER WITH POLYPROPYLENE, METHODS OF PREPARATION, AND USE IN POLYPROPYLENE COMPOSITIONS

[75] Inventors: Sudhin Datta, Matawan; David J. Lohse, Bridgewater, both of N.J.

[73] Assignee: Exxon Chemical Patents Inc., Linden, N.J.

[21] Appl. No.: 264,484

[22] Filed: Oct. 28, 1988

[51] Int. Cl.$^5$ ............................................. C08F 255/02
[52] U.S. Cl. ..................................... 525/322; 525/289; 525/290
[58] Field of Search ........................ 525/289, 290, 322

[56] References Cited

U.S. PATENT DOCUMENTS

| | | | |
|---|---|---|---|
| 3,268,624 | 8/1966 | Jezi et al. | 260/878 |
| 3,301,921 | 1/1967 | Short | 260/878 |
| 3,318,976 | 5/1967 | Short | 260/878 |
| 3,454,675 | 7/1969 | Scoggin | 260/878 |
| 3,483,273 | 12/1969 | Prucnal et al. | 525/289 |
| 3,879,494 | 4/1975 | Milkovich et al. | 525/322 |
| 4,113,802 | 9/1978 | Matteoli et al. | 260/878 |
| 4,128,606 | 12/1978 | Furutachi et al. | 260/878 |
| 4,499,242 | 2/1985 | Loontjens | 525/290 |
| 4,540,753 | 9/1985 | Cozewith et al. | 526/88 |
| 4,806,581 | 2/1989 | Walker | 525/322 |

FOREIGN PATENT DOCUMENTS

| | | |
|---|---|---|
| 0083949 | 7/1983 | European Pat. Off. |
| 19934 | 10/1967 | Japan . |
| 19542 | 8/1969 | Japan . |
| 20751 | 9/1969 | Japan . |

*Primary Examiner*—John C. Bleutge
*Assistant Examiner*—Vasu S. Jagannathan
*Attorney, Agent, or Firm*—W. G. Muller

[57] ABSTRACT

Graft polymer comprising functionalized ethylene-alpha-olefin copolymer having polypropylene grafted thereto through one or more functional linkages, the process for making the graft polymer comprising combining the functionalized ethylene-alpha-olefin with maleated polypropylene, the use of the graft polymer for improving the impact properties of polypropylene compositions, and improved polypropylene blends.

10 Claims, No Drawings

GRAFT POLYMERS OF FUNCTIONALIZED ETHYLENE-ALPHA-OLEFIN COPOLYMER WITH POLYPROPYLENE, METHODS OF PREPARATION, AND USE IN POLYPROPYLENE COMPOSITIONS

FIELD OF THE INVENTION

This invention relates to improved thermoplastic compositions. In other aspects it relates to graft polymer compositions comprising an ethylene-propylene copolymer having polypropylene grafted thereto through one or more functional linkages, to a process for making the graft polymer compositions comprising reacting functionalized ethylene-propylene copolymers with maleated polypropylene, and to blends of polymers comprising polypropylene and said graft polymer compositions having improved impact properties.

BACKGROUND INFORMATION

Isotactic polypropylene is known to be one of the lightest major plastics. Yet, because of its high crystallinity, it is known to possess high tensile strength, stiffness and hardness. These characteristics allow finished materials made thereof to have good gloss and high resistance to marring. Further, its high melting point allows it to be subjected to elevated temperatures without loss of high tensile strength. However, because of the restriction of molecular motion characteristic of isotactic polypropylene brittle behavior takes place not far below room temperature and its poor low temperature impact strength limits its usefulness.

Different ways of improving the impact strength of the polypropylene at low temperatures without unacceptable adverse effect on its other properties, including its flexural rigidity and thermal resistance have been proposed.

U.S. Pat. No. 4,113,802, MATTEOLI et al., is directed to a process for producing polypropylene-based compositions with high impact strength by first polymerizing propylene in the presence of a catalyst such as TiCl$_3$, and then adding ethylene or a mixture of ethylene and propylene and continuing the polymerization.

U.S. Pat. No. 4,128,606 FURUTACHI et al., is directed to preparation of impact-resistance polypropylene composition by first polymerizing propylene in the presence of a titanium-based catalyst and an organoaluminum compound; polymerizing propylene and ethylene in the presence of the foregoing reaction mix; and, in the presence of the reaction mix thus obtained, polymerizing either ethylene or both ethylene and propylene.

The usefulness of ethylene-propylene rubber ("EPR"), the general term for ethylene-alpha-olefin copolymer ("EPC")/ethylene-alpha-olefin-diene monomer ("EPDM") elastomeric polymers, for improving the impact strength of polypropylene ("PP") plastic compositions is known. The improvement may be generally accomplished through producing a simple physical mixture of PP with EPR.

For example, Japanese Patent No. 19934/67 is directed to producing shock-resistant polypropylene by adding an elastomer solution, which may be ethylene-propylene rubber, to polypropylene.

U.S. Pat. No. 4,087,485, HUFF, is directed to improving the impact strength of a polypropylene composition by incorporating therein minor amounts of polyethylene and ethylene-propylene copolymer.

As this literature exemplifies it is recognized that two or more polymers may be blended together to form a wide variety of random or structured morphologies to obtain products that potentially offer desirable combinations of characteristics. However, it may be difficult or impossible in practice to achieve many potential combinations through simple blending because of some inherent and fundamental problems. Frequently, the two polymers are thermodynamically immiscible, which precludes generating a truly homogeneous product. This may not be a problem per se since often it is desirable to have a two-phase structure. However, the situation at the interface between these two phases very often does lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

The word "compatibility" has a technological usage in the polymer industry which refers to whether an immiscible polymer blend tends to form a stable dispersion, one less subject to problems of gross separation or stratification. A "compatibilizer" is a polymer that has the characteristics or properties permitting it to stabilize, or "compatibilize", a heterophase polymer blend.

It is generally known that the presence of certain polymeric species, usually block or graft copolymers suitably chosen, may serve as effective compatibilizers. This is believed to occur because of a preferential location of the compatibilizer at the interface of the phases in a blend. This preferential location most likely occurs as a result of entanglement of respective segments of the compatibilizer in the phases to which the segments are similar in chemical characteristics. This increases the adhesion between the phases and as a result of reduced surface energy between the phases better dispersion is permitted. The improved dispersion is observable directly by microscopic investigation of domain size of the dispersed phase. It has been suggested that ideally the compatibilizer component should be a block or graft with different segments that are chemically identical to those in the respective phases.

Certain polymer blends have previously been utilized with compatibilizers. U.S. Pat. No. 4,299,931 is directed to compatibilized polymer blends, wherein a blend of an olefin polymer and nitrile rubber is compatibilized by the addition of a block copolymer of the olefin polymer and the nitrile rubber.

U.S. Pat. No. 4,410,482 discloses the formation of a graft copolymer of nylon and polyethylene as part of a blend of nylon and polyethylene. The presence of the graft copolymer is said to have a dramatic effect on the properties of the blends (in this case, its permeability) which can be related to its function as a compatibilizer.

Likewise U.S. Pat. No. 4,264,747 discloses compatibilizing a blend of styrene acrylonitrile resins with styrene-ethylene-butylene-styrene (SEBS) block copolymer where the SEBS copolymer has been made compatible with the styrene acrylonitrile resin by forming a graft copolymer compatibilizer by grafting a polar monomer which may be the styrene acrylonitrile resin onto the SEBS backbone.

U.S. Pat. No. 3,739,042 discloses block copolymers prepared by first polymerizing an olefin or diolefin, or combinations thereof, for example, amorphous ethylene-propylene or ethylene-propylene-cyclopentadiene, in the presence of an appropriate anionic catalyst to form a first block, then polymerizing thereto at the still "living" catalytic site monomers which polymerize by a free radical mechanism, for example, acrylonitrile, styrene, etc. The block polymers of this invention are said to possess the unique ability to render dissimilar polymers compatible in one another. The linear block copolymers of this invention are further characterized by the fact that the anionically polymerized block obtained from alpha-olefins is normally substantially crystalline, i.e., it has a degree of crystallinity of at least 25%.

Despite the above knowledge in the art, a truly effective compatibilizer for blends of isotactic polypropylene ("i-PP") plastic compositions with EPR has not been available to the public or industry prior to the invention described herein and that described in co-pending companion case U.S. Ser. No. 264,485. The prior art block polymers all suffer to varying degrees the problem that where a single catalyst system is utilized the different segments will have characteristics arising from the catalyst system chosen and not necessarily the characteristics of the blend polymers with which they are utilized. Thus where i-PP is necessarily polymerized with catalyst systems yielding stereospecific polymers having the crystalline structure necessary for plastics, EPR is typically polymerized utilizing catalyst systems yielding substantially amorphous, random copolymers. Clearly the general goal of achieving chemical identity between compatibilizer segments and respective polymers in an EPR/i-PP blend is not met when a single stereo-specific catalyst system is used for both i-PP and random EPR segments.

Thus, the graft polymers of this invention, comprising EPR grafted with i-PP through functional linkages, are believed to be unknown prior to the disclosure herein.

Various methods have been developed for preparing the prior art block polymers having polymer segments differing from one another in composition.

European Patent No. 83-949-A discloses a thermoplastic block copolymer comprising one or more crystalline propylene blocks and one or more alkene - propylene blocks, in at least one of which diene units are present (constituting an EPDM block). The polymer is prepared by first polymerizing propylene, then polymerizing an EPDM and finally polymerizing propylene or ethylene. The process relates to the formation of substantially crystalline polypropylene and specifies the use of known high-stereospecific catalyst systems, exemplifying only TiCl$_3$-containing components. Dienes which are disclosed to be suitable in the preparation of the EPDM block include norbornadiene, dicyclopentadiene, tricyclopentadiene, 5-ethylidene-norbornene -2, 5-methylene -norbornene -2, 5 vinylnorbornene -1, and 5- (2-propenylnorbornene -2).

Japanese Patent 69/19,542 discloses a method for preparing propylene/ethylene block copolymers comprising carrying out polymerization using a stereospecific catalyst in a manner to achieve specific ratios of A and B blocks. The A block can be a propylene homopolymer and the B block can be an ethylene/propylene copolymer where the length of the B block can be regulated by the addition of a diene hydrocarbon. Suitable dienes included 1,5-cyclopentadiene. The catalyst exemplified comprises TiCl$_3$. Japanese 69/20,751 contains a similar disclosure wherein propylene is polymerized alone, then propylene and 1,7 -octadiene and finally ethylene alone.

U.S. Pat. No. 3,454,675 discloses a method of preparing block polymers of mono -1- olefins using two reactors. The reactors are compartmented to prevent short circuiting of the catalyst in the first reactor which results in a short residence time for some of the catalyst in the first reactor. A first mono -1- olefin is polymerized in the first reactor, the polymer and its catalyst is transferred to the second reactor and the second mono -1- olefin is copolymerized therein. In one embodiment the reaction mixture of the first reactor is stripped of unreacted first mono -1- olefin before transferring it to the second reactor in order to achieve pure block polymer. In another embodiment the unreacted monomer is transferred with polymer and catalyst to the second reactor. The result is a mixed block copolymer that can comprise a polypropylene segment and an ethylene-propylene copolymer segment. Catalyst systems are based on transition metal halides of titanium, zirconium, hafnium or germanium, TiCl$_3$ is preferred.

U.S. Pat. No. 3,268,624 discloses a method for preparing a two segment block copolymer of ethylene and propylene which comprises first polymerizing a feed comprising propylene and propylene with a small amount of ethylene using a catalyst comprising titanium trichloride, an alkylaluminum dihalide, and an alkoxy silane. After the polymerization has proceeded for the desired length of time the first (propylene) feed is discontinued and a second feed of ethylene or ethylene with a small amount of propylene is fed to the reactor.

U.S. Pat. No. 3,301,921 discloses a composition of matter comprising a highly isotactic polypropylene polymer chain, uninterrupted by ethylene, having attached thereto, at one end, an ethylene-propylene copolymer. The process for forming the composition of the invention utilizes catalyst and operation conditions selected to produce stereospecific polymers. The ethylene content of the block polymer is about 1 to 20 wt. % while the ethylene content of the ethylene-propylene segment is about 10 to 90 wt. %. The product is said to have improved impact resistance over polypropylene alone. The propylene polymerization is carried out to about 90 to 95% of the desired propylene conversion. Either the polypropylene or the ethylene-propylene copolymer can be produced first, in both cases the first polymerized monomer(s) are contacted with a stereo-specific catalyst with subsequent addition of the second monomer(s) to the reaction mix. The catalyst used is TiCl$_3$ with aluminum alkyl or aluminum alkyl halides. U.S. Pat. No. 3,318,976 discloses and claims the process for preparing the product claimed in the '921 patent. Both patents are continuation-in-part applications based on the same earlier filed application (Ser. No. 77,776 filed Dec. 22, 1960).

Ziegler-Natta catalysis is capable of producing highly isotactic therefore highly crystalline polymers and in addition can be used to polymerize a wide range of monomers including ethylene and propylene. Additionally Ziegler-Natta catalysis can be utilized to produce random, elastomeric copolymers from the same readily available monomers depending upon the choice of catalyst system. However, this method of catalysis results in polymerization of very short duration making sequential polymerization of crystalline and random polymer segments difficult or impossible. A method was sought therefore that could utilize the benefits of Ziegler-Natta polymerization to produce a polymer composition having both crystalline PP segments and highly random, substantially amorphous EPR segments to serve as both a compatibilizer for PP/EPR blends and a PP impact strength improver.

OBJECTS OF THE INVENTION

Accordingly, it is an object of this invention to provide a graft copolymer of polypropylene and ethylene-alpha-olefin copolymer that is useful in the field of thermoplastic compositions. More specifically, it is an object of this invention to provide graft copolymers of polypropylene and ethylene-alpha-olefin copolymer where the respective segments retain the stereospecific characteristics of substantial crystallinity in the polypropylene segment(s) and a large degree of randomness in the ethylene-alpha-olefin copolymer segment(s) and a process for preparing them. Another object of the invention is to provide blends of polypropylene that exhibit improved properties, including impact strength, gained by the inclusion of the graft polymer of the invention.

SUMMARY OF THE INVENTION

The present invention is broadly directed to graft copolymer compositions comprising a functionalized ethylene-alpha-olefin copolymer having polypropylene grafted thereto through one or more functional linkages. It is further directed to a process for preparing the graft copolymer compositions broadly comprising combining functionalized ethylene-alpha-olefin copolymer with maleated polypropylene under conditions sufficient to permit grafting of at least a minor portion of the functionalized polymer with the polypropylene.

The invention is further directed to blends of copolymers comprising isotactic polypropylene and the graft copolymer compositions of this invention. It is also directed to methods for compatibilizing blends of ethylene-propylene rubber and isotactic polypropylene comprising incorporating in said blends said graft copolymer compositions.

DETAILED DESCRIPTION OF THE INVENTION

Functionalized Ethylene-Alpha Olefin Copolymer

Since the graft copolymer compositions of this invention comprise a graft copolymer preferably having a structure directed to optimizing its use as a compatibilizer in PP/EPR blends, the graft copolymer will preferably have constituent segments that resemble the blend components as closely as possible in terms of molecular weight, crystallinity and, for the functionalized ethylene-alpha-olefin copolymer, compositional distribution of at least the ethylene and alpha-olefin monomers. Thus the functionalized ethylene-alpha-olefin copolymer segment or segments of this invention (hereinafter referred to as "functionalized EPC") is meant to include terpolymers, tetrapolymers, etc. It will comprise ethylene, one or more alpha-olefins, and optionally, one or more diene monomers; it will have one or more functional sites thereon provided by one or more functional-group containing monomers; it will be substantially amorphous; and it will have a substantially random arrangement of at least the ethylene and the alpha-olefin monomers.

The functionalized EPC, prior to grafting with maleated polypropylene, will generally have a molecular weight range approximately equivalent to that of any of the EPR components useful in PP/EPR blends, or preferably, approximately equivalent to that of the specific EPR component in the blend. Typically this will be between about 5,000 and up to about 1,000,000 or higher, more typically between about 10,000 and 500,000, and even more typically between about 15,000 and 350,000, where the molecular weight is weight-average ("$M_w$").

Typically EPR is "substantially amorphous", and when that term is used to define the functionalized EPC it is to be taken to mean having a degree of crystallinity less than about 25% as measured by means known in the art, preferably less than about 15%, and more preferably less than about 10%. The three major known methods of determining crystallinity are based on specific volume, x-ray diffraction, and infrared spectroscopy. Another well-established method, based on measurement of heat content as a function of temperature through the fusion range, is now easily carried out using differential scanning calorimetric measurements. It is known that these independent techniques lead to good experimental agreement. The degree of randomness of the arrangement of monomers in the functionalized EPC, or EPR, also affects the crystallinity and is appropriately characterized by the degree of crystallinity.

Additionally, it is known in the art that the tendency of a particular combination of catalyst system and monomers to produce blocky, random, or alternating polymers can be characterized by the product of the reactivity ratios defined for the given monomers under the specific reaction conditions encountered. If this product is equal to 1.0, the sequence distribution will be perfectly random; the more the product is less than 1.0, the more the monomers will approach alternating sequence; and, the more the product is greater than 1.0, the more the monomers will tend to have a "blocky" sequence distribution. Generally speaking, the segments of a polymer which crystallize are linear segments which have a number of identical (both by chemical make-up and stereo-specific orientation) units in a row. Such segments are said to be "blocky". If there is little or no such sequential order within the segments making up a polymer chain, that chain will be very unlikely to conform itself into the correct shape to fit into the spatial order of a crystal and will accordingly exhibit a low degree of crystallinity. The functionalized EPC portion of the graft polymer of this invention accordingly is characterized by the limitation that its method for preparation has a reactivity ratio product less than 2.0, preferably less than about 1.5, and more preferably less than about 1.25.

The functionalized EPC will contain about 20 to about 90 weight percent ethylene, preferably about 30 to 85 weight percent ethylene, and even more preferably about 35 to about 80 weight percent ethylene.

Alpha-olefins suitable for use in the preparation of the functionalized EPC are preferably $C_3$-$C_{16}$ alpha-olefins. Illustrative non-limiting examples of such alpha-olefins are one or more of propylene, 1-butene, 1-pentene, 1-hexene, 1-octene, and 1-dodecene. The alpha-olefin content of the functionalized EPC is generally about 10 to about 80 weight percent, preferably about 20 to about 70 weight percent. As indicated above the choice of alpha-olefin, or alpha-olefins if a mix is used, preferably will follow that of the alpha-olefin(s) in the EPR though a selection that differs within the examples given above will still be useful to some extent for the purposes of this invention.

The diene monomers useful in this invention include those typically used in known EPDM polymers. The typically used diene monomers are generally selected from the easily polymerizable non-conjugated dienes and can be straight chain, hydrocarbon di-olefins or cycloalkenyl-substituted alkenes, having about 6 to about 15 carbon atoms, for example:

A. straight chain acyclic dienes such as 1,4-hexadiene and 1,6-octadiene.

B. branched chain acyclic dienes such as 5-methyl-1, 4-hexadiene; 3,7-dimethyl-1,6- octadiene; 3,7-dimethyl-1, 7-octadiene and the mixed isomers of dihydro-myricene and dihydro-ocinene;

C. single ring alicyclic dienes such as 1,3-cyclopentadiene; 1,4-cyclohexadiene; 1,5-cyclo-octadiene and 1,5-cyclododecadiene;

D. multi-ring alicyclic fused and bridged ring dienes such as tetrahydroindene, methyl, tetrahydroindene, dicyclopentadiene; bicyclo-(2,2,1)-hepta-2,5-diene; alkenyl, alklindene, cycloalkenyl and cycloalkylidene norbornenes such as 5-methylene-2-norbornene (MNB), 5-ethylidene-2-norbornene, 5-isopropylidene-2-norbornene, 5-(4-cyclopentenyl)-2-norbornene, 5-cyclohexylidene-2-norbornene, 5-vinyl-2-norbornene; and E. cycloalkenyl-substituted alkenes, such as allyl cyclohexene, vinyl cyclooctene, allyl cyclodecene, vinyl cyclododecene.

Of these, the preferred dienes are dicyclopentadiene, 1,4-hexadiene, 5-methylene-2-norbornene, and 5-ethylidene-2-norbornene. Particularly preferred dienes are 5-ethylidene-2-norbornene and 1,4-hexadiene. It will be apparent that a mix of such dienes can also be utilized. The content of the optional diene monomer in the functionalized EPC can be 0 to about 15 weight percent, and if used, preferably 0.5 to about 12 weight percent, and most preferably about 1.0 to about 6.0 weight percent.

The one or more functional sites that constitute in part the functionalized EPC of this invention is provided by the incorporation with the EPC backbone chain of one or more polar functional groups capable of reacting with maleated polypropylene. Typically these polar functional groups will be hydroxyl, primary amino or secondary amino and are represented by the following formulae:

—OH, —NH$_2$, —NHR$_1$, where Rhd 1 is hydrocarbyl of from 1 to about 20 carbon atoms, preferably alkyl of from 1 to 5 carbon atoms, cycloalkyl of from 3 to 7 carbon atoms, and the like. Any manner of incorporation of these polar functional groups with the EPC backbone will be effective for the purposes of this invention, several are well-known in the art.

The content of polar functional groups incorporated in the functionalized EPC will be that sufficient to provide at least one site on each functionalized EPC polymer which is reactive with maleated polypropylene. Thus, the polar functional group-containing monomer is present in the functionalized EPC in amount equal to at least 0.01 wt. % of the functionalized EPC. The content may range up to about 15 wt. % of the functionalized EPC, preferably the content will be from about 0.01 to about 10 wt. %, more preferably about 0.05 to about 7 wt. %, and most preferably from about 0.5 to about 2 wt. %. Whether incorporated by copolymerization or grafting, the polar functional groups will be present in an amount of from about 0.5 to about 30.0 milliequivalents per 100 grams of polymer ("meq/100 g.") as measured by infrared analysis, more preferably 2 to 20 meq/100 g., and most preferably 5 to 15 meq/100 g.

Maleated Polypropylene

The graft copolymer composition of this invention comprises the functionalized EPC described above subsequently graft-reacted with maleated polypropylene to yield a functionalized EPC having one or more polypropylene segments grafted thereto through the one or more functional linkages thus formed. The maleated polypropylene may be any of the conventionally known polypropylene compounds that are subsequently maleated by methods known in the art.

More particularly, the polypropylene graft segment or segments will preferably resemble in molecular weight and crystallinity the polypropylene component or compound with which the graft polymer of this invention may be blended. Thus, the molecular weight of the polypropylene segment(s) is between $\frac{1}{3}$ and 3 times that of the blend polypropylene and is most preferably equal. While an ideal match is preferred, "mismatched" weights will be useful to some extent and are considered within the scope of the invention. Thus, the polypropylene segment(s) will have molecular weights of about 10,000 up to about 10,000,000, or higher, preferably about 50,000 to about 300,000 M$_w$. While molecular weights lower than that of the blend polypropylene will have some effect, the effects will decrease as molecular weight decreases. Generally speaking, there is little effect for i-PP below its "entanglement molecular weight" which is that weight at which there is little incorporation of the PP segment of the graft polymer into the PP matrix and effectiveness as a compatibilizer or modifier is substantially diminished. This lower limit is about 10,000 M$_w$.

The crystallinity, or tacticity, of the polypropylene is preferably roughly equivalent to that of the matrix in which used (which will vary by end use) and accordingly may vary from being substantially amorphous to being completely crystalline, that is from about 0-100% crystallinity. Most typically, because of the extensive commercial use of isotactic polypropylene, both the graft polypropylene and the matrix polypropylene will be substantially crystalline, e.g., greater than about 90%. Generally, the polypropylene is substantially free of ethylene. However, under certain circumstances small amounts of ethylene, on the order of less than about 5% by weight, may be incorporated. Furthermore, in certain instances the polypropylene plastics making up the bulk of the polymer blends for which this invention is useful contain small amounts of ethylene in copolymers known as "reactor copolymers". Thus, it is within the scope of the invention that the graft polypropylene contain minor amounts of ethylene, both as part of ethylene-propylene segments and as polyethylene segments. As a general rule, the tacticity of the polypropylene arms is similar enough to that of the propylene in the blend so as to have the arms co-crystallize with the blend component—most preferably the tacticity of the polypropylene is substantially equivalent.

Polymerization conditions for the preparation of polypropylene are well known in the art. Propylene can be polymerized into isotactic polypropylene in the presence of stereo-specific Ziegler-Natta catalyst systems comprising compounds of the transition metals of Groups 4 to 6 and 8 of the Periodic Table of elements, preferably titanium compounds, most preferably titanium halides, and organometalic compounds of elements of groups 1 to 3 of the Periodic Table, especially aluminum alkyls or aluminum alkyl halides. Illustrative examples include titanium trichloride, titanium tetrachloride as catalysts and triethylaluminum and diethyl aluminum chloride as cocatalysts. These transition metal catalyst systems can be non-supported or supported, for example, silica gel, or metal oxides and dihalides, such as MgO, $MgCl_2$, $ZnCl_2$, etc. Such systems can be reacted together and can be complexed with a variety of Lewis-base electron donors. Molecular weight control is typically achieved by the incorporation of hydrogen via a feed stream into the polymerization reactor. The hydrogen is added at about 0 to 30 mole % based on the total monomer. The polymerization reaction is preferably conducted according to the slurry method employing an inert hydrocarbon diluent or liquid propylene as the vehicle. The polymerization temperature can be in the range of about 50° C. to about 100° C. and is preferably at a range or about 60° C. to about 80° C. Polymerization pressure can also vary over a wide range and is not particularly limited. The polymerization pressure can for example be in the range from between atmospheric pressure to $3.7 \times 10^3$ KPa. Such procedures and components are only illustrative of the knowledge in the art with respect to polypropylene polymerization, any are contemplated as useful within the scope of the invention. For general review of literature and patents in the art see "Olefin Polymers (Polypropylene)" in the Kirk-Othmer Encyclopedia of Chemical Technology, 3rd Edition v. 16, 453-469 (J. Wiley & Sons, 1981).

The maleinization of the polypropylene compound to maleated polypropylene is conveniently accomplished by heating a blend of polypropylene and ethylenically unsaturated carboxyl group-containing compounds, e.g., maleic anhydride, within a range of about 150°-400° C., often in the presence of free-radical initiators such as organic peroxides that are well-known in the art. Free-radical grafting of the carboxyl group-containing compounds onto the polypropylene readily results. Methods of preparing these graft polymers are well-known in the art as illustrated, inter alia, in U.S. Pat. Nos. 3,480,580, 3,481,910, 3,577,365, 3,862,265, 4,506,056, and 3,414,551 the disclosures of which are incorporated herein by reference. Such processes are well-known in the art, for example, an independent source of the description of the process is found in Y. Minoura, M. Ueda, S. Mizinuma and M. Oba, J. Applied Polymer Sci. 1625 (1969). The use of heat and/or physical shearing optionally with the free-radical initiators, in such equipment as extruders, masticators, and the like, to simultaneously accomplish controlled degradation in molecular weight of the polypropylene along with the free-radical grafting of the maleic anhydride, all as known in the art, will be useful in accordance with this invention.

In particular, it is preferable to conduct the maleinization with such amounts of maleic anhydride and free-radical initiators, and under conditions of temperature and shearing such that free-radical sites on the polypropylene are formed substantially at the time of scission of the polypropylene chains and are formed at the point of such scission. The maleic anhydride is then grafted onto the scissioned end of one side of such broken chains. In this manner the anhydride groups are located principally at the ends of the maleated polypropylene chains, and the substantial majority of such maleated polypropylene chains contain one site of maleinization. This permits grafting of the maleated polypropylene at its maleated end to the functionalized EPC at the site of the polar functional group thereon. Multiple sites of maleinization can lead to grafting of the maleated polypropylene to more than one functionalized EPC polymer chain or at more than one site of one or more functionalized EPC polymer. This can result in the formation of crosslinked, polymer networks, or gel, that in substantial amounts will be detrimental to the objects of this invention.

In accordance with the above, the free-radical initiator is preferably used and will typically be utilized in an amount of from about 0.01 to 1.0 wt. %, preferably from about 0.02 to 0.5 wt. %, and most preferably from about 0.04 to 0.3 wt. % of the total polypropylene, and solvent if used, and will be added first. The mixture is then heated to a temperature at or about the known decomposition temperature of the selected free-radical initiator, concurrently with any optional mechanical shearing. The maleic anhydride is subsequently added in an amount typically from about 0.01 to 10.0 wt. %, preferably from about 0.1 to 5 wt. %, and most preferably about 0.75 to 2 wt. % of the total polypropylene.

The maleated polypropylene of this invention will contain from about 0.01 wt. % incorporated maleic anhydride, based upon the weight of the maleated polypropylene, and can range up to about 5 wt. %. Preferably the maleic anhydride content will be from about 0.01 to about 2 wt. %, most preferably about 0.03 to about 0.2 wt. %. As will be apparent, unreacted polypropylene will also be present in the reaction mix as will minor amounts of reaction by-products, such as decomposed free-radical initiator compounds and low molecular weight free-radical products. These by-products are substantially removed, by methods known in the art, e.g., sparging with nitrogen or washing with water. Maleic anhydride may not be left in substantial amounts in the polymer without detrimental affects on the subsequent reaction of the functionalized EPC with the maleated polypropylene.

Preparation of the Functionalized EPC

The functionalized EPC of this invention can be prepared by either copolymerization of the constituent monomers or by the grafting of polar functional monomers onto an ethylene-alpha-olefin copolymer backbone, which is meant to include any of the conventionally known ethylene-alpha-olefin/ethylene-alpha-olefin-diene monomer elastomeric polymers.

Thus in one embodiment the process for preparing the graft polymer of this invention comprises the steps of:

(A) combining under polymerization conditions sufficient to form functionalized ethylene-alpha-olefin copolymer, ethylene, at least one alpha-olefin monomer, and at least one functional group-containing monomer, in the presence of a non-stereospecific Ziegler-Natta catalyst system selected for its capability for producing random copolymers;

(B) combining a polymer composition prepared in accordance with step (A) and a maleated polypropylene composition under conditions sufficient to permit grafting of at least a minor portion of the functionalized copolymer with maleated polypropylene.

Descriptions for Ziegler copolymerization of functional polymers are to be found, inter alia, in U.S. Pat. Nos. 3,492,227, 3,761,458, 3,796,687, 4,017,669, 4,139,417 and 4,423,196, the disclosures of which, including compounds and processes, are incorporated by reference. These patents teach the preparation of elastomeric ethylene random terpolymers, tetrapolymers, etc., from alpha-olefins, non-conjugated dienes and unsaturated polar functional monomers by direct Ziegler-Natta polymerization of the monomers, usually in solvent, utilizing catalyst systems composed of trivalent, and higher, vanadium compounds, organoaluminum compounds and halogenated reactivator compounds, organoaluminum compounds and halogenated reactivator compounds. These polymerization reactions are run in the absence of moisture in an inert atmosphere and in a preferred temperature range of 0° to 65° C. Both continuous and batch reactions are taught. Typical compounds include: alkenyl alcohols, e.g., 4-pentene-1-ol, 10-undecen-1-ol, 2-norbornene-5-methanol; amides, e.g., undecylamide, acrylamide, methacrylamide; unsaturated derivatives of imides, e.g., N-alkenated cyclic imide derivatives of such as maleimide, N-allyl succinimide, and the like.

These ethylene terpolymers, tetrapolymers, etc., are readily prepared using soluble Ziegler-Natta catalyst compositions. Such non-stereospecific Ziegler-Natta catalyst systems useful in accordance with this invention for producing random ethylene alpha-olefin copolymers include the organic and inorganic components of the transition metals of Group 4A to 8A of the Mendeleyev Periodic Table of the Elements. Particularly useful are the halides, oxyhalides, esters, acetyl acetonates, etc., of the metals vanadium, zirconium and hafnium. As is well known in the art, these are utilized with cocatalyst organo-aluminum compounds, organo-aluminum halides, mixtures, etc. The systems may be utilized in solvent, slurry or gas-phase processes and may be supported on inert supports, such as silicon dioxide, silica gel, or metal oxides or chlorides of zinc, magnesium, etc. Also as known, pre- polymers may be formed as supports for these catalyst systems. Catalyst activators or promoters, molecular weight regulators, Lewis-base electron donors all may be utilized as disclosed in the art.

More particularly, in carrying out the process of this invention, the preferred non-stereospecific Ziegler-Natta catalyst systems are those that exhibit a differential polymerization activity with the monomers used such that the rate of conversion of ethylene and the diene monomers are approximately equal yet greater than the rate of conversion of propylene, which is equal to or greater than the rate of conversion of other selected alpha-olefins. Rates of conversion are measured, as known in the art, by, for example, feeding known weight percent amounts of the selected monomers in solvent into a standard continuous-flow stirred tank reactor along with the catalyst/co-catalyst system, and analyzing the weight percent monomer content (again in solvent) of the resulting polymer product. The rate of conversion is the weight percent of the monomer in the polymer product to the weight percent of the monomer in the initial feed stream. Ethylene content is determined conveniently by methods described in ASTM D3900, diene monomer content is determined conveniently by refractive index methods as described in I. J. Gardner and G. VerStrate, *Rubber Chem. Tech.*, 46, 1019 (1973). Such preferred catalyst systems are based on vanadium compounds which have a vanadium valence of at least 3, and which are soluble in the polymerization diluent; preferably the vanadium catalyst is $VX_4$ or an oxyvanadium compound of the general formula $VOX_n(OR')_{3-n}$ where n is an integer of 2 or 3, R' is a hydrocarbyl radical and X is halogen, preferably chlorine or bromine. Preferably R' is $C_1$-$C_{10}$ alkyl, phenyl or benzyl, more preferably R' is $C_1$-$C_4$ alkyl, e.g., methyl, ethyl or butyl. $VCl_4$ and $VOCl_3$ are particularly useful in this functionalized EPC are the vanadium salts of beta-diketonates having the general formula of $V(O\ O)_3$ where O O represents the diketonate anion, e.g., vanadium-tris (2,4-pentanedionate).

The preferred cocatalysts utilized to prepare an appropriate active catalyst species are the alkyl aluminums and alkyl aluminum halides. A particularly preferred cocatalyst is an aluminum compound such as $Al_2R''_3X'_3$ or $AlR''_bX'_{3-b}$, wherein R'' is a hydrocarbyl moiety, X' is halogen and b is 1 to 2. While the halogen can be chlorine, bromine or iodine, the preferred halogen is chlorine. The hydrocarbyl moiety can be a $C_1$-$C_{20}$ alkyl, cycloalkyl or aromatic group. Preferably R'' is $C_1$-$C_{10}$ alkyl or cycloalkyl, phenyl or benzyl. Most preferably R'' are methyl, ethyl, n-propyl, isobutyl, hexyl, cyclohexyl, phenyl or mixtures thereof. In its preferred embodiment the aluminum compound is a dialkyl aluminum halide or alkyl aluminum sesquihalide. More preferably the aluminum compound is diethyl aluminum chloride ("DEAC") or ethyl aluminum sesquichloride ("EASC"). In utilizing the catalyst system of this invention the vanadium compound and aluminum compound can be utilized at a Al/V mole ratio of about 1 to about 40, preferably about 2 to about 20, more preferably about 3 to about 10, e.g., 5 to about 10.

Suitable polymers may be prepared in either batch or continuous reactor systems, in gas phase, solution or slurry polymerizations. In particular, effective use can be made of a tubular reactor system to achieve novel molecular composition and molecular weight distribution in accordance with U.S. Pat. No. 4,540,753, which is incorporated herein by reference. In common with all Ziegler-Natta polymerizations, monomers, solvents and catalyst components are dried and freed from moisture, oxygen or other constituents which are known to be harmful to the activity of the catalyst system. The feed tanks, lines and reactors may be protected by blanketing with an inert dry gas such as purified nitrogen. Chain propagation retarders or stoppers, such as hydrogen and anhydrous hydrogen chloride, may be fed continuously or intermittently, to any but the tubular reactor of U.S Pat. No. 4,540,753, for the purpose of controlling the molecular weight and/or MWD within the desired limits.

Additionally, it is known to incorporate "branch suppressors" during EPDM polymerization to reduce branching. It is known in the art that certain Lewis bases, e.g., $NH_3$, are effective as branch suppressors. Additionally, certain alkoxy silanes, e.g., methyl silicate ($Si(OMe)_4$), ethyl silicate ($Si(OEt)_4$), etc., have been recently discovered to act as effective branch suppressors without reducing catalyst efficiency or reactivity. The particular amount of suppressor required to suppress branching will depend on the nature of the suppressor, the diolefin, the catalyst system, the Al/V ratio and the polymerization conditions. The use of excessive amounts of silicates will result in reduced catalyst activity. The silicate concentration can also be expressed in terms of Si/V mole ratio and can vary from about 0.1 to about 3.0. The vanadium and aluminum compounds can be added to the reactor either separately or premixed with one another. The silicates, optionally used as branching suppressors, should be added to the reactor separately and not in combination with any of the catalyst components in order to avoid reaction with the catalyst components and an alteration of their polymerization characteristics.

End-Capped Functionalized EPC

In a preferred embodiment of this invention the functionalized EPC is prepared in accordance with the method of copending, commonly assigned U.S. application Ser. No. 813,848, the disclosure of which is incorporated by reference. According to this method both ethylene-alpha-olefin copolymer and ethylene-alpha-olefin-diene-monomer elastomeric polymers are terminated during polymerization with suitable end-capping agents to yield a functionalized EPC containing the functional group —OH, in or near the terminal position in the elastomeric polymer chains. Subsequent reaction of this functionalized EPC with maleated polypropylene in accordance with this invention yields an elastomeric ethylene-alpha-olefin copolymer segment having grafted thereto through its —OH functional grouping a polypropylene segment. Thus, as practiced in this fashion, a graft polymer composition is formed whereby the polypropylene is essentially end-grafted to the terminally functionalized EPC through a functional linkage.

More particularly, this "end-capped" functionalized EPC is prepared in a batch or substantially mix-free tubular reactor in accordance with the disclosure of U.S. Pat. No. 4,540,753, previously incorporated by reference, except that at a particular inlet port, for the tubular reactor, or a particular time, for the batch reactor, which as illustrated can be chosen so that the elastomeric polymer formed has achieved a selected molecular weight, specific end-capping agents are added via a side-stream. The end-capping agent not only adds to the polymer chain being formed but simultaneously poisons the polymerization catalyst such that additional monomers present can no longer be copolymerized. The end-capping agents effective within the teachings of the instant invention to result in the addition of a hydroxyl functional group, include the following:

$CO_2$,

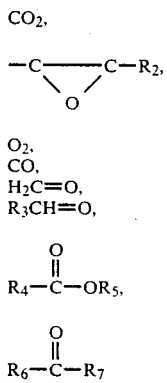

$O_2$,
$CO$,
$H_2C=O$,
$R_3CH=O$, $R_4-\overset{O}{\underset{\|}{C}}-OR_5$, $R_6-\overset{O}{\underset{\|}{C}}-R_7$ wherein $R_2$ through $R_7$ are hydrocarbons having 1–30 carbon atoms selected from the group consisting of saturated or unsaturated, branched or unbranched being aliphatic, aromatic, cyclic, or polycyclic hydrocarbons.

In this manner, a hydroxy functional group-containing monomer or compound is added to form functionalized EPC. The functional group is therefore added in an amount previously indicated so as to provide reactive sites for the maleated polypropylene.

Masked-Monomer Copolymerization of Functionalized EPC

Another preferred embodiment of the functionalized EPC of this invention can be prepared by the copolymerization process disclosed and taught in co-pending, commonly assigned application Ser. No. 059,711, incorporated herein by reference. In accordance with the disclosure of this application ethylene, alpha-olefins, optional non-conjugated dienes and unsaturated functional monomers chemically "masked" by pre-reaction with certain non-halogenated organometallic compounds, can be copolymerized in a conventional Ziegler-Natta polymerization reaction utilizing, e.g., vanadium, zirconium or titanium catalysts with organoaluminum co-catalysts and conducted generally in solvent at temperatures ranging preferably from about 15°–60° C. The functionalized EPC of this invention can then be produced by de-ashing the initially formed polymer by known methods utilizing various aqueous liquids, separating the resulting aqueous phase from the polymer-rich solvent phase and subsequently separating the polymer from the polymer-rich solvent phase.

More particularly, useful unsaturated functional monomers that are chemically reacted with non-halogenated organometallic compounds prior to Ziegler-Natta polymerization are those which contain hydroxyl, amino, imino, or carbonyl groups having the general formula:

$$R_8(X)_n$$

wherein $R_8$ is selected from ethylenically unsaturated hydrocarbyl radicals, and X is selected from the group consisting of hydroxyl (—OH) and amino (—NHR') groups and carbonyl (—C(O)R'), and imino (—C(R")=NR') moieties, and wherein n is an integer of at least 1, preferably 1–4, and more preferably 1–2. R' and R" in the above X groups may be the same or different and can comprise H or hydrocarbyl (preferably H or saturated hydrocarbyl), e.g., of 1 to 15 carbon atoms, and preferably alkyl of 1 to 5 carbon atoms, cycloalkyl of from 3 to 7 carbon atoms, and the like. Exemplary of such amino groups are —$NH_2$ and alkyl amino groups, e.g., —$NHCH_3$, —$NHC_2H_5$, —$NHC_3H_7$, —$NHC_4H_9$, and the like. Exemplary of carbonyl groups are —C(O)H, and —C(O)R', such as —$C(O)CH_3$, —$C(O)C_2H_5$, —$C(O)C_3H_7$, —$C(O)C_4H_9$, and the like. Exemplary of such imino groups are —C=NH, —$C=NCH_3$, —$C=NC_2H_5$, —$C=NC_3H_7$, —$C=NC_4H_9$, and the like. Where n is greater than 1, X may include one or more of the foregoing exemplary functional groups.

The ethylenically unsaturated hydrocarbyl radical $R_8$ typically consists of radicals derived from ethylene, alpha-olefins, 1 to 30 carbon atom-homologous of alpha-olefins, norbornene and 1 to 30 carbon atom alkyl-substituted homologues of norbornene. The substitution on the norbenyl radical can be at C-2 or C-7 position, as conventionally known, i.e., bicyclo-[2.2.1] hept-5-en-2-yl, or bicyclo [2.2.1]-hept-2-en-7-yl. $R_8$ preferably contains from 2 to 25 carbon atoms.

Preferred unsaturated functional monomers thus include:
(a) 5-norbornene-2-methanol,
(b) 5-norbornene-2-carboxaldehyde,
(c) 5-norbornene-2-carboxy-(N-n-butyl) imine,
(d) 5-norbornene-2-carboxy-(N-phenyl) imine,
(e) 5-norbornene-2-methylamine
(f) allyl alcohol,
(g) allyl amine.

Multiple functional monomers include 5-norbornene-2,3-dicarboxyaldehyde, 5-norbornene-2,3-di(carboxy-(N-phenyl) imine 4-hydroxy-5-methyl carboxy-hex-1-ene. Mixtures of such monomers also may be utilized.

These unsaturated functional monomers may be prepared by conventional methods known in the art. For example, 5-norbornene-2-carboxy (N-n-butyl) imine can be formed by a Diels Alder addition of cyclopentadiene to vinyl acrolein, followed by reaction of the resulting 5-norbornene-2-carboxaldehyde with n-butyl amine:

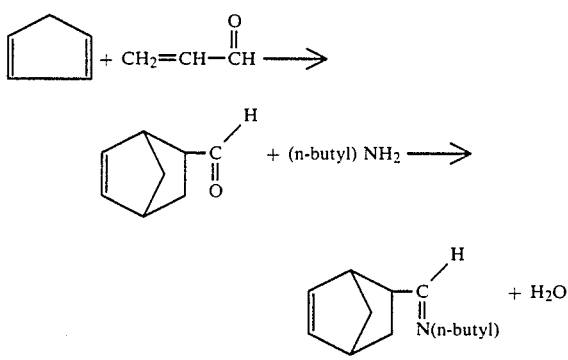

Exemplary of the masking agents disclosed to be effective in masking the unsaturated functional monomers include at least one of the non-halogenated organometallic compounds selected from the group represented by the formula:

$$M-(Y)_r$$

wherein M is a member selected from Group IIA, IB, IIB, IIIA, IVA, and the transition metals and elements, r is an integer from 1 to 4 and is selected so as to satisfy the valence for metal M, and Y is at least one of $R_9$, $R_{10}$ $R_{11}$ and $R_{12}$, wherein $R_9$-$R_{12}$ are (preferably independently) selected from the group consisting of hydrogen and $C_1$-$C_{16}$ hydrocarbyl and $C_1$-$C_{16}$ hydrocarbyloxy, which may or may not contain unsaturation, including $C_1$-$C_{16}$ alkyl, $C_6$-$C_{16}$ aryl, $C_1$-$C_{16}$ alkoxy, and $C_6$ to $C_{16}$ aryloxy, provided that at least one of $R_9$-$R_{12}$ is not hydrogen.

Suitable organometallic compounds include diethylzinc, triethyl aluminum, triisobutyl aluminum, diisobutyl aluminum hydride, diethyl aluminum hydride, trimethyl aluminum, ethyl aluminum dihydride, dipropyl zinc, propyl zinc hydride, diethoxy aluminum hydride, trimethoxy aluminum, sodium alkyls (e.g., $NaCH_3$, $NaC_3H_7$, methyl magnesium hydride, dimethyl [bis(cyclopentadienyl)] titanium, with triisobutylaluminum, triethylaluminum, and diisobutyl aluminum hydride being most preferred. Generally speaking, the organoaluminum compounds are preferred over organomagnesium compounds which are in turn preferred over organozinc compounds.

The masking agent and the unsaturated functional monomer are preferably contacted in an amount sufficient to provide from about 0.3 to 3, more preferably from about 0.6 to 2, and most preferably from about 0.8 to 1.5 (e.g., from about 0.95 to 1.05) moles of the masking agent per equivalent of the unsaturated functional monomer. As used herein, "equivalent" refers to the mole of the unsaturated functional monomer multiplied by the number of functional "X" group(s) in it. For example, if a given unsaturated functional monomer contains two X groups per molecule, mole of such is equal to 2 unsaturated functional monomer equivalents.

The masking reaction, which can be performed in a batchwise, continuous or semi-continuous manner, is preferably carried out by adding the unsaturated functional monomer to the selected metal alkyl masking agent, preferably in the presence of an inert solvent or diluent. The masking agent and unsaturated functional monomer should be contacted under substantially anhydrous and oxygen-free conditions and for a time effective to form the corresponding masked, unsaturated functional monomer without substantial degradation of the unsaturated functional monomer. As used herein, the term "degradation of the unsaturated functional monomer" is intended to include side-reactions of the unsaturated functional monomer and any component of the masking reaction mixture, such as unsaturated functional monomer alkylation, rearrangement and prepolymerization, which decrease the yield of masked, unsaturated functional monomer obtained in contacting the selected unsaturated functional monomer and masking agent. Preferably, the selected unsaturated functional monomer and masking agent should be contacted at a temperature and for a time sufficient to form the masked, unsaturated functional monomer in essentially quantitative yields; that is, in yields of the masked, unsaturated functional monomer of at least about 95%, more preferably at least about 97%, and most preferably at least about 99%, based on the unsaturated functional monomer fed to the masking reactor.

The masking reaction should be performed in a reaction zone cooled to maintain the reactants at a temperature of less than 60° C. (e.g., less than about 50° C.), generally less than about 30° C., more generally from about −70° C. to 30° C., e.g., from about −20° C. to +20° C., and most preferably from about −15° C. to +10° C. The pressure employed in the masking reactor is not critical, and any convenient pressure can be employed, e.g., from about 0.05 to 20,000 KPa. Generally, the unsaturated functional monomer and masking agent will be contacted for the masking reaction for a time of from about 0.001 to 10 hours, preferably from about 0.2 to 3 hours.

The masking reaction may be conveniently carried out under an inert gas (such as $N_2$, Ar, He), to exclude the presence of air in the masking reaction zone. Any solvent useful for Ziegler-Natta polymerization can be employed in the masking reaction provided the choice of solvent does not lead to degradation of the monomer as defined above. For example, suitable solvents include hexane, butane, pentane, heptane, cyclopentane, cyclohexane, cycloheptane, methyl cyclopentane, methyl cyclohexane, isooctane, benzene, toluene, xylene, chlorobenzene, tetrachloroethylene and dichloroethane.

The product mixture produced in the masking reaction, containing the masked, unsaturated functional monomer, desirably should be maintained at a temperature of less than 60° C. (e.g., less than about 50° C.), preferably less than about +30° C., preferably from about −70° C. to +30° C., and more preferably from about −20° C. to +20° C., until the masked monomer is contacted for polymerization with the ethylene, alpha-olefin(s), and, optionally, non-conjugated diolefin(s).

In a preferred embodiment, the masked, unsaturated functional monomer prepared with one of the alkyl-substituted masking agents is reacted with a lower alkanol, e.g., isopropyl, isobutyl or t-butyl alcohol. This results in the formation of an alkoxy radical that is derived from the reactant alkanol bonded to the metal component of the masking agent now complexed in the masked, unsaturated functional monomer. The alcohol-modified masked monomers have increased solubility in heptane and thus are particularly useful.

The polymerization process used in accordance with the disclosure of Ser. No. 059,711 is performed in an otherwise conventional manner using suitable methods, including batchwise, semi-batch or continuous operations, conventional polymer chain monomers, and catalysts known to be effective for such polymerization. The process is preferably carried out in one or more conventional reactors, including substantially mix-free reactor systems, e.g., continuous flow tubular reactors, and stirred-batch reactors, see U.S. Pat. No. 4,540,753. Thus, the functional EPC of this invention may be formed by polymerizing ethylene and one or more alpha-olefins with the masked, functional group-containing monomers in the presence of a polymerization catalyst, wherein the polymerization catalyst includes at least one vanadium compound, zirconium compound or hafnium compound, preferably wherein the vanadium compound has a valence of at least 3 (e.g., 3 to 5, and is preferably selected from the group consisting of vanadium halide, vanadium oxyhalide, and vanadium salts of beta-diketonates, with the vanadium halide preferably being vanadium tetrachloride and the vanadium oxyhalide compound having the general formula $VOX'_{n-}(OR_{13})_{3-n'}$ where n is an integer of 2 or 3, $R_{13}$ is a hydrocarbyl radical which is preferably a $C_1$–$C_{10}$ alkyl, phenyl or benzyl and more preferably $C_1$–$C_4$ alkyl (such as a member of the group of methyl, ethyl, and butyl), and X' is halogen which is preferably chlorine or bromine. The vanadium salts of beta-diketonates have the general formula of $V(O\ O)_3$ where O O represents the beta-diketonate anion. The preferred beta-diketonate is 2,4-pentanedionate.

The polymerization catalyst preferably also includes an organoaluminum co-catalyst comprising organoaluminum halides and organoaluminum compounds having the formula $(R_{14})AlX''_{3-x}$ wherein X'' is a halogen, each $R_{14}$ is the same or different and is selected from the group consisting of alkyl and aryl (and preferably wherein each $R_{14}$ is a member selected from the group consisting of $C_1$–$C_{16}$ alkyl and phenyl, which is most preferably ethyl), and x is between 0 and 3, and preferably greater than 0 up to 2 (e.g. between 1 and 2), and more preferably from 1 to 1.5. Illustrative, non-limiting examples of the aluminum halide cocatalyst useful in the practice of this invention include an ethyl aluminum dichloride, diethyl aluminum chloride and ethyl aluminum sesquichloride.

It is preferred to have the vanadium compound and the organoaluminum cocatalyst present in the polymerization catalyst in a molar ratio of vanadium to aluminum more preferably being about 1:5 to 1:15. The catalyst and the masked unsaturated functional monomers may be present in a molar ratio of vanadium to masked, unsaturated functional monomers of about 1:5 to 1:100, with the molar ratio of vanadium to masked, unsaturated functional monomers preferably being about 1:10 to 1:30. The V catalyst can be supported on conventional catalyst supports (e.g., on silica, $MgCl_2$, zirconium, and the like). Electron donor modified versions of supported V catalytic systems can also be used.

The polymerization reaction zone for this polymerization process can also contain one or more of the conventional polymerization promoters, such as halogenated and non-halogenated organic polymerization promoters.

Inasmuch as the polymerization reaction used for purposes of the present invention is otherwise conventional, the polymerization reaction can be carried out at any temperature suitable for Ziegler catalysis such as a temperature of about −20° C. to about 150° C., or preferably about 0° C. to about 100° C. and more preferably about 15° C. to about 60° C. The pressure used in the polymerization process can vary from about 0 KPa to about 3000 KPa and preferably from about 20 KPa to about 1500 KPa; more preferably about 100 KPa to about 1000 KPa and 250 KPa to 100 KPa, most preferably about 300 KPa to about 600 KPa.

The masked, unsaturated functional monomer should not be premixed with any halogen-containing component of the polymerization catalyst (e.g. vanadium halide or organoaluminum halide) and left to stand for any appreciable period of time to avoid degradation of the masked monomer. Preferably, the masked monomer is added to the polymerization reaction zone separately from the polymerization catalyst components, so as to first contact the polymerization catalyst in the presence of the other monomers, preferably under polymerization conditions.

Any known diluent or solvent for the reaction mixture that is effective for the purpose can be used in conducting polymerization in accordance with the present invention. For example, suitable diluents or solvents would be hydrocarbon solvents such as aliphatics, cycloaliphatics, and aromatic hydrocarbon solvents, or halogenated versions of such solvents. The preferred solvents are $C_{12}$ or lower straight-chain or branched-chain, saturated hydrocarbons, and $C_5$ to $C_9$ saturated alicyclic or aromatic hydrocarbons, or $C_2$ to $C_6$ halogenated hydrocarbons. Most preferred are $C_{12}$ or lower straight-chain or branched-chain hydrocarbons, particularly hexane. Non-limiting illustrative examples of diluents or solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

The polymerizations of this process can be carried out in the presence of a molecular weight regulator to produce a polymer having any particular desired molecular weight. A molecular weight regulator commonly used in this type of process is, for example, hydrogen. The amount of molecular weight regulator to be used can easily be chosen based on principles well-known to those skilled in the art, depending upon the desired molecular weight of the polymer. It is within the scope of this process to incorporate hydrogen as a feed stream to the polymerization zone to moderate polymer molecular weight. The hydrogen will be generally added in an amount of from about 0 to about 30 mole percent, based on the total monomer.

Branch suppressors may also be utilized in accordance with the process, both the Lewis bases and the alkoxy silanes. Concentrations and amounts will be as earlier described for general EPDM polymerization processes, as will be the specifics of utilization.

After polymerization, the polymerization reaction mixture is quenched at the exit of the reactor. This quenching can be accomplished by the introduction into the polymerization reaction mixture (e.g., in the reactor or into polymerization product effluent stream) of water, lower alkanol, or aqueous acid (e.g. aqueous HCl) as quench liquid, generally using from 1 to 30 moles of quench liquid per mole of total V and Al in the reaction mixture.

It has been found that the desired functionality group, i.e., X, incorporated into the functionalized polymer as the masked functional group, can be regenerated by removal of the masking metal, M, through use of conventional de-ashing techniques, wherein the quenched polymerization product, containing masked-functionalized polymer, the polymerization catalysts, and unreacted monomers, is contacted with an aqueous liquid, e.g., water, aqueous solutions containing mineral acids (e.g., HCl, HBr, HNO$_3$, H$_2$SO$_4$, H$_3$PO$_4$, a nd the like), aqueous solutions containing mineral bases (e.g., caustic ammonia, sodium methoxide and the like) or mixtures thereof. The resulting hydrolysis reactions (hereinafter referred to as "de-ashing") liberate the metal masking agent and regenerates the functional group, thereby forming a functionalized polymer.

De-ashing to regenerate the functional group, can be conveniently accomplished by contacting the quenched polymerization product with from 0.3 to 3 volumes of water per volume of polymerization reactor effluent (in equivalent units); the water may optionally contain from 1 to 30 wt. % (e.g. 3 to 10 wt. %) of mineral acid(s). The mixture is contacted for a time and under conditions sufficient to de-ash the polymer and to regenerate the functional group. Generally, the contacting will be conducted for a time of from about 3 to 30 minutes, and a temperature of from about 0° C. to 85° C., with vigorous stirring. The use of an acidic aqueous liquid may be followed by one or more water washes of the separated polymer to remove residual amounts of the mineral acid. The 2-phase liquids resulting in the above steps will permit recovery of a polymer-containing upper liquid phase comprising the functionalized polymer and polymerization solvent or diluent, and an aqueous lower liquid phase containing the mineral acid, and aqueous soluble salts of the catalyst and masking agent metal(s). The aqueous layer will preferably also contain unreacted unsaturated functional monomer, due to the water solubility of the unsaturated functional monomer attributed by the hydrophilic nature of the "X" functionality.

The polymer may be recovered from the upper phase by flash evaporation followed by drying to remove residual water. The flashing technique can involve the addition of the quenched polymerization product to a tank of hot water (50° C. to 100° C.) sprayed with steam to strip off the solvent and unreacted monomers. The polymer may be then dried by evaporation of water, generally at temperatures of from about 150° C. to 200° C., e.g., on a hot rubber mill.

Polar Monomer Graft Functionalized EPC

The graft addition of the polar functional groups described above is conveniently accomplished by heating a blend of ethylene-alpha-olefin and/or ethylene-alpha-olefin-diene monomer elastomer, prepared conventionally, and ethylenically-unsaturated polar group-containing compounds within a range of about 225°–400° C., often in the presence of free-radical initiators such as organic peroxides. The use of heat and/or physical shearing, optionally with the free-radical initiators, in such equipment as extruders or masticators to simultaneously accomplish controlled degradation in molecular weight of the ethylene-alpha-olefin or EPDM elastomer along with the free-radical grafting of ethylenically-unsaturated polar group-containing compounds, all as known in the art, will be particularly useful in accordance with this invention.

The graft addition to ethylene-alpha-olefin and EPDM elastomers of primary and secondary nitrogen-containing monomers and hydroxyl group-containing monomers is well-known in the art. Description appears in, inter alia, U.S. Pat. Nos. 3,862,265, 4,026,967, 4,068,057 and 4,388,202, the disclosures of which are incorporated by reference. Typical monomers include the alkenyl alcohols, e.g., 4-pentane-1-ol, 10-undecen-1-ol, 2-norbornene-5-methanol; amides, e.g., undecylamide, acrylamide, methacrylamide; and unsaturated derivatives of imides, e.g., N-alkenated cyclic imide derivatives such as maleimide, N-allyl succinimide, and the like. Though ethylenically unsaturated polar group-containing monomers are specifically addressed and described above, it is also known that certain saturated monomers may be graft reacted with ethylene alpha-olefin and EPDM polymers. In particular, U.S. Pat. No. 4,068,057 describes the mechanically induced amino-grafting of alpha-olefin polymers with saturated mono-amines and polyamines that may additionally include other groups such as hydroxy, additional amine, imidazoline, and the like.

One or more of the preferred polar functional groups useful in accordance with this invention are thus readily incorporated in the functionalized EPC.

Preparation of the Graft Copolymer Composition

In broadest terms the process for preparing the graft polymer of this invention comprises combining the functionalized ethylene-alpha-olefin copolymer with the maleated polypropylene under conditions sufficient to permit grafting of at least a minor portion of the functionalized polymer with the polypropylene. Thus the graft copolymer composition of this invention will comprise the reaction product of the above described functionalized EPC having at least one reactive polar group and the maleated polypropylene. The reaction is accomplished by contacting the functionalized EPC with the maleated polypropylene whereupon interaction and crosslinking take place. Apparently the nitrogen- or oxygen-containing polar functional groups, the hydroxy, primary or secondary amino groups, of the functionalized EPC form covalent chemical bonds with the maleic moieties of the maleated polypropylene forming functional linkages between the functionalized EPC and maleated polypropylene. The polypropylene is thus grafted to the functionalized EPC through covalent chemical functional linkages.

For best results, an approximately equivalent molar equivalent molar proportion of maleic moiety to polar functional group can be employed. The contacting can be accomplished by combining solutions of the polymeric reactants in suitable solvents, such as benzene, toluene, and other inert inorganic solvents, in a suitable reaction vessel under substantially anhydrous conditions. Heating will accelerate the reaction and is generally preferred. However, the reaction is exothermic and will occur at ambient temperatures. More preferably commercially, the contacting can be accomplished by premixing pre-formed pellets of the neat functionalized polymers and melt processing in a physical blender or mixer, such as an extruder, at temperatures of from about ambient to about 350° C., preferably about 75° to about 300° C., and most preferably 150° to about 250° C. In this same manner, a polypropylene blend composition can be prepared while forming the graft copolymer composition of the invention in situ. One or more of polypropylene, and optionally ethylene-propylene rubber compositions are additionally provided to the mixer in pellet form along with the pre-formed pellets of functionalized polymers. It is important that essentially all moisture or water be removed by drying prior to contacting the polymer reactants in order to avoid hydrolysis reactions which will compete with the sought crosslinking and reduce the yield of the graft copolymer composition of this invention.

Polypropylene Blend Compositions

The polypropylenes useful in the polypropylene blend compositions of the invention are normally solid isotactic polypropylenes, i.e., polypropylenes of greater than 90% hot heptane insolubles, having a melt flow rate (MFR) of from about 0.5 to about 30 g/10 minutes (230° C., 2160 g load). The particular density of the polypropylene is not critical. As known, such isotactic polypropylenes are normally crystalline and have densities ranging from about 0.89 to about 0.93 g/cc. Preferably, a polypropylene having a melt flow rate within the range of from about 1.0 to about 20 is employed. Moreover, the blends of the invention can include more than one polypropylene component, i.e., several polypropylenes having different melt flow rates, whereby the resulting blends have melt flow rates within the above ranges. Further, these polypropylenes include reactor copolymers of polypropylene (RCPP) which can contain about 1 to about 20 wt. % ethylene or an alpha olefin comonomer of 4 to 16 carbon atoms. The RCPP can be either a random or block copolymer. The density of RCPP can be about 0.80 to about 0.91 g/cc.

Methods for preparation of these propylene polymers are well known in the art. Generally, these polymer compositions can be prepared in the manner of the polypropylene segment of the graft polymer of this invention as described.

The EPR of the blends of this invention are comprised of copolymerized monomers of ethylene, alphaolefins, e.g., propylene, and, optionally, known DM's, e.g., 1,4-hexadiene, 5-ethylidene-2-norbornene, as more fully described above for the EPC portion of the graft polymer of this invention. The molecular weight range of these EPR polymers is that disclosed in the art and will typically range from about 5,000 to 1,000,000 weight average molecular weight ($M_w$), typically about 10,000 to 500,000 $M_w$, most typically about 15,000 to about 350,000 $M_w$. Mooney viscosity ($ML_{1+8}$, 127° C.) will typically range from about 10 to about 90, more typically about 20 to about 75.

EPR is prepared by procedures known in the art and more specifically described above for the EPC of this invention, though without the inclusion of polar functional monomers. Examples of commercially available polymers are VISTALON ®, elastomeric copolymers of ethylene and propylene alone or with 5-ethylidene-2-norbornene, marketed by Exxon Chemical Company, Houston, Tex., and Nordel ®, a polymer of ethylene, propylene and 1,4-hexadiene, marketed by E. I. duPont de Nemours & Company, Wilmington, Del.

These ethylene copolymers, terpolymers, tetrapolymers, etc., are readily prepared using soluble Ziegler-Natta catalyst compositions. For a review of the literature and patent art see: "Polyolefin Elastomers Based on Ethylene and Propylene", by F. P. Baldwin and G. VerStrate in Rubber Chem. & Tech. Vol. 45, No. 3, 709–881 (1972) and "Polymer Chemistry of Synthetic Elastomers", edited by Kennedy and Tornqvist, Interscience, New York, 1969. For more recent review see: "Elastomers, Synthetic (Ethylene-Propylene)" by E. L. Borg in Encyclopedia of Chemical Technology, 3d Ed., Vol. 8, 492–500 (Kirk-Othmer, 1979) and "Ethylene-Propylene Elastomers", by G. VerStrate in Encyclopedia of Polymer Science and Engineering, Vol. 6, 2d Ed., 522–564 (J. Wiley & Sons, 1986).

Suitable polymers may be prepared in either batch or continuous reactor systems, in gas phase, solution or slurry polymerizations. In particular, effective use can be made of a tubular reactor system to achieve novel molecular composition and molecular weight distribution in accordance with U.S. Pat. No. 4,540,753, which is incorporated herein by reference. In common with all Ziegler-Natta polymerizations, monomers, solvents and catalyst components are dried and freed from moisture, oxygen or other constituents which are known to be harmful to the activity of the catalyst system. The feed tanks, lines and reactors may be protected by blanketing with an inert dry gas such as purified nitrogen. Chain propagation retarders or stoppers, such as hydrogen and anhydrous hydrogen chloride, may be fed continuously or intermittently, to any but the tubular reactor of U.S. Pat. No. 4,540,753, for the purpose of controlling the molecular weight and/or MWD within the desired limits. Additionally, as described above, it is known to incorporate "branch suppressors" such as certain Lewis Bases, e.g., $NH_3$, and certain silicates, during the EPDM polymerization to reduce branching.

The improved polypropylene blend compositions of the invention generally comprise from about 45% by weight to about 98% by weight polypropylene, from 0 to about 50% by weight EPR, and from about 0.1% to about 25% by weight of the graft copolymer. More preferably, the impact blends of the invention have about 65 wt. % to about 90 wt. % polypropylene, about 8 wt. % to about 30 wt. % EPR, and about 1 wt. % to about 15 wt. % graft polymer. Most preferably, the graft copolymer is incorporated at about 2 wt. % to about 10 wt. %, with the propylene and EPR adjusted within the foregoing ranges. All weight percents are based on the total weight of the combined polymers making up the final impact blend composition.

Generally the polypropylene blend compositions of the invention can be prepared by mixing the graft polymer, elastomer and polypropylene components in any order and subjecting the mixture to temperatures of, for example, 175° to about 210° C. Such mixing and heating can be accomplished using any conventional hot processing equipment in the art, such as a Banbury Mixer, a roll mill, a twin screw extruder, etc., employing known thermoplastic processing techniques. Optionally, a masterbatch blending technique is employed wherein the elastomer and graft copolymer are mixed with a portion of the polypropylene, e.g., at about 30 to about 50 wt. % of the total weight of the masterbatch blend (for elastomer and graft components), and about 3 to about 12% of the total amount of polypropylene of the inventive impact blend and, subjected to the above-mentioned blending or curing conditions. This produces a melt-flowable thermoplastic elastomeric blend having a discontinuous elastomeric phase intimately dispersed in a continuous polypropylene phase, each phase having incorporated therein one or more of the respective similar segments of the graft polymer. This blend can then be pelletized for ease of handling. This masterbatch blend is then available for intimate mixing with homopolymer polypropylene at an elevated blending temperature at a desired ratio to produce the impact blend of the invention having the above-mentioned respective polymer components.

For laboratory purposes a physical blend may be accomplished by dissolving the graft polymer in a suitable solvent, such as xylene, and then adding the EPR and PP compounds while stirring. The order of addition is unimportant. This is illustrated in the Examples, the results are generally equivalent but on a laboratory scale.

The compositions of this invention, as with other polypropylene blends known in the art, can contain stabilizers, antioxidants, fillers, processing aids, pigments, and other additives if desired, in normal and conventional amounts, depending upon the desired end use. The polypropylene blends of the invention can be used to produce films, filaments, rods, protective coatings, molded and extruded shaped articles, and the like, by procedures known in the art.

Experimental Procedures

The following experimental procedures were used in the illustrative examples that follow. These procedures/tests carried out as follows:

Kumagawa Extraction

This procedure was used to determine the different solubility of polymer blends in various solvents.

About 5 (±2) grams of the polymer sample was cut into pieces, approximately 0.3 cm cubes, and introduced into a tared stainless steel mesh extraction envelope. The sample was weighed and extracted to constant dry weight (usually 24-72 hours) with the appropriate solvent by a continuous extraction procedure in a commercial Soxhelt extraction apparatus (Ace Glass Company, Vineland, N.J.). At the end of the extraction period with each solvent the sample in the extraction envelope was dried under vacuum and weighed to determine loss of weight FTIR Measurements The reaction of the grafted maleic anhydride residues on the maleated polypropylene and the polar functional groups on the functionalized EPC was determined by FTIR (Fourier Transform Infrared Spectroscopy) measurements.

FTIR Spectra of the polymer blends were determined on a Sirius 100 Spectrometer of Mattson Instruments Inc., Madison, Wis. Specimens suitable for analysis were made by pressing out films of the polymer blends at thicknesses of 2-5 microns. Spectra were run between 3000 cm$^{-1}$ and 600 cm$^{-1}$ and were plotted in the absorbance mode. Strong absorbance peaks in the region 1600 cm$^{-1}$ to 2100 cm$^{-1}$ were found for the reaction product. The following values correspond to those generally known in the literature, see, for example, Organic Chemistry by J. Hendrikson, D. J. Cram and G. S. Hammond, 3rd Ed., Pub. McGraw Hill, New York, N.Y.

Maleic anhydride (MA) grafted PP (MA-g-PP) = 1780 cm$^{-1}$

Reaction product of alcohol EPC and MA-g-PP = 1710 cm$^{-1}$ + 1740 cm$^{-1}$

Reaction product of secondary amine EPC and MA-g-PP = 1675 cm$^{-1}$ + 1710 cm$^{-1}$ Reaction product of primary amine EPC and MA-g-PP = 1645 cm$^{-1}$ and 1710 cm$^{-1}$.

Quantitative measurements of the relative amounts of these materials in the blends was obtained by measuring the relative intensities of the absorbance peaks for each reactant or product.

Gel Permeation Chromatography (GPC)

Molecular weights for the polymers were determined by gel permeation chromatography.

Molecular weight (number average, $M_n$; weight average, $M_w$; z average, $M_z$) and molecular weight distribution (MWD) were measured using a Waters 150 gel permeation chromatograph equipped with a Chromatix KMX-6 on-line light scattering photometer. The system is used at 135° C. with 1,2,4-trichlorobenzene as the mobile phase. Showadex (Showa-Denko America, Inc.) polystyrene gel columns 802, 803, 804 and 805 were used. The technique utilized is described in *Liquid Chromatography of Polymers and Related Materials III.* J. Cazes, editor, Marcel Dekker, 1981, p. 257, incorporated herein by reference. No corrections for column spreading are employed; however, data on generally accepted standards, e.g., National Bureau of Standards Polyethylene 1484 and anionically produced hydrogenated polyisoprene demonstrate that such corrections on $M_w/M_n$ was calculated from an elution time-molecular weight relationship whereas $M_z/M_n$ is evaluated using the light scattering photometer. The $M_w/M_n$ are used as an indication of MWD breadth (the larger the value, the broader the MWD). Data is reported in this application as Mn (GPC), $M_w$ (GPC), $M_z$ (GPC and $M_w/M_n$ (GPC).

EPR Analysis

Infrared analysis (ASTM D3900) was used to measure polymer ethylene content while refractive index (I. J. Gardner and G. VerStrate, *Rubber Chem. Tech.*, 46, 1019 (1973)) was used for diene content. Polymer Mooney viscosity Was measured by ASTM-D1646.

Functionalized EPC Analysis

Polymers containing polar functional groups were analyzed for functionality content by an infrared spectroscopy procedure.

Polymers containing alcohol functionality (P-CH$_2$OH) were dissolved in hexane (approx. 3 wt. % solution) and quantitatively esterified with an equal volume of acetic anhydride, according to the reaction below:

$$P-CH_2OH + (CH_3.CO)_2O$$
$$P-CH_2.OCOCH_3 + CH_3CO_2H$$

After refluxing for two hours, the polymer was recovered, molded in a pad of uniform thickness between 0.003 to 0.02 inch thick. The infrared spectrum of the sample contained an intense absorption at 1743 cm$^{-1}$ due to the carbonyl group. The intensity of this absorption was measured in absorbance units (A$_2$). This was correlated to the concentration of milliequivalents alcohol functionality expressed in milliequivalents per 100 gm of polymer (C$_{alcohol}$) by the following relationship:

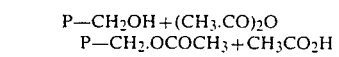

$$C_{alcohol} = A_2/t_2 \times 84.2$$

where $t_2$ is the thickness of the polymer sample pad expressed in thousandth of an inch.

Polymers containing amine functionality were similarly amidated with acetic anhydride and the intensity of the carbonyl absorption at 1660 cm$^{-1}$ of a molded pad of uniform thickness measured in absorbance units ($A_3$) was correlated to the concentration of amine functionality expressed in milliequivalents per 100 gm of polymer ($C_{amine}$) by the following reaction:

$$C_{amine} = A_3/t_3 \times 72.9$$

where $t_3$ is the thickness of the polymer sample expressed in thousandth of an inch.

These analytical relations were obtained by measuring the infrared extinction coefficients for the carbonyl groups and closely related monomeric model compounds in hexane media.

PP Polymer Analysis

Polypropylene used for these blends was characterized by Melt Flow Rate (MFR) measured according to ASTM D1238 condition L.

Functional PP Analysis

Maleic anhydride grafted polypropylene was analyzed for functionality content by FTIR. Sample preparation methods are described above; spectra was recorded in the absorbance mode. The amount of incorporated functionality, maleic anhydride as wt. % of total polypropylene (MAH %) both graft and ungrafted, was calculated using the following correlation:

$$\text{MAH \%} = 0.124 \log \frac{A_{1780}}{t}$$

where $A_{1780}$ is the IR absorbance at 1780 cm$^{-1}$ and t=thickness of the film in mm.

Impact Strength

Impact strength of the polymers and polymer blends was determined by Izod impact strength measurements. The test was carried out according to ASTM 256 Method A on sample specimens prepared as described below.

Samples of the polymer were injection molded into specimens of dimension 5"×0.5"×0.125" at temperatures between 220° C. and 250° C. The injection time was 12 seconds, with a cooling cycle of 20 seconds. The specimen was removed and 1.25" was removed from each end along the long dimension to leave a central test specimen of 2.5"×0.5"×0.125". "Notched" tests were run with the test bar notched to a depth of 0.1" with a symmetrical V-groove with the angle at the bottom of the groove being 45°. The notch was placed perpendicular to the thin edge of the bar and parallel to the width dimension (0.5"). Results on test run on these specimens are distinguished from others by inclusion of the word "notched" in the experimental tables.

Tensile Testing

Tensile testing of the blends was performed to show the effects of compatibilization on the physical properties of the samples. The size and shape of the sample as well as the testing procedure are described in ASTM D638. In all cases the samples were injection molded at a temperature of 200° C. on a Boy molding machine. Two types of molds were used. In the majority of the tests a singly gated mold was used to make the "dog-bone" samples. The only tensile test for which this was not the case was that for "knit-line tensile strength", in which a doubly-gated mold was employed. Because the polymer melt entered the cavity at two points, a knit-line was formed, which is the weakest point in the sample and thus the point at which it breaks. Such a property is measured to more truly reflect the situation in complicated moldings. In all tensile tests, several (3 to 5) samples were made and test results were averaged to reduce the effect of random variation.

Scanning Electron Microscopy (SEM)

Polymer blends were analyzed by a procedure using Scanning Electron Microscopy. This technique provides information on the degree of dispersion of the normally incompatible EP and i-PP into domains of different sizes.

The equipment used for this test was a SEM obtained from Japan Electro Optic Limited. Polymer samples, usually in the form of pellets, were microtomed into thin sections as described in *Polymer Microscopy*, L. C. Sawyer and D. T. Gribb, pages 85-92 (Chapman & Hall, N.Y., N.Y., 1987). Suitably microtomed sections were extracted, without mechanical agitation, with hexane at room temperature for 5 minutes and thin coated with a suitable contrast enhancer—most typically carbon. SEM microphotographs of these samples were obtained under conventional machine operating conditions. The surfaces in the polypropylene domains appeared light gray in microphotographs while the holes in the microtomed sections which correspond to the EPR domains appeared darker.

Light Scattering

This procedure was used to determine the weight-average molecular weight ($M_w$) of both the graft copolymer and its precursor reactants. The increase in $M_w$ indicates that grafting has occurred.

For each polymer, dilute (0.6 wt. %) solutions were made in 1,2,4-trichlorobenzene. These were heated to 150° C., and the light scattered at various angles was measured on a Chromotix KMX-6. The data were analyzed by standard techniques as discussed in "Introduction to Physical Polymer Science", by L. H. Sperling, Wiley-Interscience, N.Y., 1986, page 64.

COMPARISON EXAMPLE 1

200 grams of isotactic polypropylene ("PP") having a melt flow rate ("MFR") of 1.0 were mixed with 50 grams of ethylene-propylene copolymer ("EPC") having a Mooney viscosity ($M_L$, 1+8, 127° C.) of 29 and an ethylene content of 29 wt. % in a Midget Banbury for 2 minutes at 170° C. The resulting product was then separated in the following manner: 200 grams of the blend were dissolved in xylene in dilute (1%) solution, and then precipitated on a support. As is known, ethylene-propylene elastomeric copolymers are soluble in xylene at temperatures generally below about 30° C. whereas isotactic polypropylene is substantially insoluble in xylene at temperatures less than about 90° C. To effect the separation, the temperature was then raised slowly to dissolve increasing amounts of the blend from the support. Thus, as shown in Table I the first fraction consisted of those parts in the blend soluble at 32.5° C. or less; the second consisted of those soluble between 32.5° C. and 40° C.; and so on in 10° C. intervals to the seventh fraction, which contained those portions not soluble below 90° C. The results in the table show that nearly all (96.1%) of the blend was in either the first or last fraction, corresponding to the proportions of EPC and PP, respectively. The 3.9 wt. % sum of the middle fractions most likely represents PP of low molecular weight or poor tacticity.

EXAMPLE 2

200 grams of isotactic PP maleated with 0.15 wt. % maleic anhydride and having an MFR of 110 was mixed with 50 grams of functionalized EPC having an $M_L$ (1+8, 127° C.) of 23, 45 wt. % of ethylene, and 12.8 meq/100 gms+polymer of the polar functional group —NH (n-butyl), were mixed and then separated in the same manner as described in Example 1. The results in Table I show that the blend of Example 2 separated differently from Example 1, even though the overall content of EPC and PP were the same in both blends. The middle five fractions of Example 2 constituted 21.7% of the sample as compared to 3.9% for Example 1. Moreover, all fractions, including the first and last ones exhibited the presence of both EPC and PP by FTIR measurements. Thus, the differences between the fractionation of the two blends arise from the presence of graft copolymer in Example 2, at a level of at least about 18%.

TABLE I

| FRACTIONATION | | |
|---|---|---|
| Composition (g) | Comparison Example 1 | Example 2 |
| PP | 200 | — |
| EPC | 50 | — |
| Maleated PP | — | 200 |
| Functionalized EPC | — | 50 |
| Total EPC Content (wt %) | 20 | 20 |
| Percent Functional Components | 0 | 100 |
| Fractionation (wt %) Temperature | | |
| 32.5° C. | 21.5 | 13.8 |
| 40° C. | 1.4 | 2.5 |
| 50° C. | 0.3 | 2.9 |
| 60° C. | 0.5 | 2.3 |
| 70° C. | 0.7 | 3.2 |
| 80° C. | 1.0 | 10.8 |
| 90° C. | 74.6 | 64.5 |

COMPARISON EXAMPLE 3

23.3 grams of isotactic PP having an MFR of 12.0 were mixed with 10 grams of an EPC having an $M_L$ (1+8, 127° C.) of 12 and an ethylene content of 48 wt. % in a Brabender at 170° C. for 10 minutes. This blend was then fractionated using a Soxhlet apparatus. First, the fraction soluble in pentane at its boiling point was removed. The pentane-insoluble fraction was then fractionated again with hexane, and the fraction soluble in hexane up to its boiling point was removed. The hexane-insoluble fraction was then fractionated a third time, now with xylene as the solvent. The xylene soluble and insoluble fractions were recovered. The weight percents of each are shown in Table II. As expected, essentially all of the EPC was dissolved in pentane. A substantial portion of the PP was found in the xylene-soluble fraction.

EXAMPLE 4

23.3 grams of the maleated PP of Example 2 and 10 grams of a functionalized EPC having a $M_L$(1+8, 127° C.) of 17, 45 wt. % ethylene, and 13 meq/100 gms of the polar functional group —OH were mixed and then fractionated as described in Example 3. The fractionation results in Table II show that most of the functionalized EPC was insoluble in pentane or hexane, indicating that it had become grafted to the maleated PP. The results on the form of the functional maleic group, determined by FTIR and shown in Table III, also evidenced the grafting. About half of the original maleic anhydride groups in the maleated PP have been converted to a half-acid, half-ester in the bonding with the functionalized EPC.

EXAMPLE 5

15 grams of the maleated PP of Example 2 and 15 grams of the functionalized EPC of Example 4 were mixed and fractionated as described in Example 3, except that only hexane and xylene were used for fractionation, not pentane. The fractionation and functionality results in Table II again show that substantial grafting had occurred, from the shift of EPC solubles to higher temperatures and the change of anhydride to half-acid, half-ester segments.

The molecular weights of the maleated PP, the functionalized EPC, and the reaction product of this example were measured by light scattering. These experiments were done on 0.6 wt. % solutions of each of the three samples in trichlorobenzene at 150° C. Analysis of the results indicated the weight-average molecular weight ($M_w$) of maleated PP as $8.08 \times 10^4$, that of the functionalized EPC as $7.43 \times 10^4$, and that of the product as $20.9 \times 10^4$. This data shows that on average two polypropylene chains were grafted to each EPC molecule.

EXAMPLE 6

20 grams of isotactic PP maleated with 0.19 wt. % maleic anhydride and having an MFR of 8.9 and 20 grams of a functionalized EPC having an $M_L$ (1+8, 127° C.) of 18, an ethylene count of 51.2 wt. %, and 11 meq/100 gms of polymer of the polar functional group —NH$_2$ were mixed in a Brabender as in Example 5, except that the temperature was 200° C. Fractionation was also performed in a similar manner, but using only hexane and xylene as solvents, not pentane. Again, a large amount of grafting occurred, as evidenced by the fractionation and FTIR results. In this case, some gel (xylene insoluble material) was also formed.

EXAMPLE 7

5 grams of the maleated PP of Example 2 and 5 grams of a functionalized EPC having an $M_L$ (1+8, 127° C.) of 25, an ethylene content of 47.4 wt. % and 15.2 meq/100 gms of polymer of polar functional group —OH were dissolved in 500 ml of xylene, mixed and allowed to react for 3 hours at 140° C. The solution was then precipitated into methanol and recovered. This product was fractionated as described in Example 3. Once more the fractionation and FTIR data in Table II show that a substantial amount of grafting occurred in this solution blend.

EXAMPLE 8

1,500 grams of the maleated PP of Example 2 and 1,500 grams of a functionalized EPC having an $M_L$(1+8, 127° C.) of 26, an ethylene content of 45 wt. % and 8.5 meq/100 gms of polymer of the polar functional group —NH(C$_4$H$_9$) were mixed in a Werner Pfleiderer twin-screw, counter rotating extruder at 200° C. with a residence time of 2 minutes. A portion of this extrudate was then fractionated as described in Example 3, but using only hexane and xylene as solvents. Fractionation results again showed that a graft copolymer was made. Also in this example, gel was formed.

that these "block copolymers", which instead may be blends made in the polymerization reactor, do not function as compatibilizers for such EPC/PP blends.

TABLE II

|  | 3 | 4 | 5 | 6 | 7 | 8 |
|---|---|---|---|---|---|---|
| Composition (g) | | | | | | |
| PP | 23.3 | — | — | — | — | — |
| EPC | 10.0 | — | — | — | — | — |
| Maleated PP | — | 23.3 | 15 | — | 5 | 1500 |
| Maleated PP | — | — | — | 20 | — | — |
| Functionalized EPC | — | 10.0 | 15 | — | — | — |
| Functionalized EPC | — | — | — | 20 | — | — |
| Functionalized EPC | — | — | — | — | 5 | — |
| Functionalized EPC | — | — | — | — | — | 1500 |
| Total EPC Content (wt %) | 30 | 30 | 50 | 50 | 50 | 50 |
| Percent Functional Components | 0 | 100 | 100 | 100 | 100 | 100 |
| Mixing Method | Brabender | Brabender | Brabender | Brabender | Solution | Extruder |
| Fractionation (wt %) | | | | | | |
| Pentans Soluble | 29.0 | 10.1 | — | — | 20.4 | — |
| Hexane Soluble | 5.9 | 3.6 | 32.5 | 26.7 | 12.8 | 30.0 |
| Xylene Soluble | 64.8 | 81.4 | 52.5 | 41.1 | 66.5 | 30.1 |
| Xylene Insoluble | 2.0 | 4.8 | 15.0 | 32.1 | 0.3 | 39.9 |
| Functionality Type as Determined by FTIR (wt %) (Wt. % of the Blend) | | | | | | |
| Acid | — | 0.029 | 0.080 | 0.031 | — | — |
| Ester | — | 0.047 | 0.125 | 0.006 | 0.274 | — |
| Anhydride | — | 0.108 | 0.036 | 0.019 | 0.060 | — |

COMPARISON EXAMPLE 9

200 grams of the PP of Example 1 were mixed as in Example 1 in a Banbury with 50 grams of the EPC of Example 1. Samples of this blend were tested for Izod impact strength under three conditions: with a notched specimen at 21° C., notched at −18° C. and using an unnotched specimen at −30° C. The tensile properties of the blend were also tested (ASTM D638).

Specimens of the blend were microtomed and extracted with hexane to remove the EPC. A scanning electron-microscope was then used to image three phase domains. The range of domain size is reported in Table III, as are the results of the physical tests.

EXAMPLE 10

180 grams of the PP of Example 1, 45 grams of the EPC of Example 1, 20 grams of isotactic PP maleated with 0.22 wt. % of maleic anhydride and having an MFR of 9.2, and 5 grams of the functionalized EPC of Example 2 were mixed in a Banbury Mixer to form an in situ graft copolymer of this invention intermixed in a polypropylene blend composition. The product was tested as described in Example 9. The data given in Table III shows the compatibilizing effect of the graft polymer made from this in situ reaction of maleated PP with functionalized EPC. The domain size of phases was reduced by a factor of two, and the low temperature impact strength was improved, by more than three times at −18° C. The elongation at break, a measure of tensile strength, increased more than ten times without a significant difference in other physical properties.

COMPARISON EXAMPLE 11

180 grams of the PP of Example 1, 45 grams of the EPC of Example 1 and 25 grams of Himont 8523, commercially available from Himont Corp. of Wilmington, Del., and sold as a reactor block copolymer of PP and EP, having a MFR of 4, and a Tg of 0.C, were mixed as in Example 9. Izod impact testing and SEM were also performed on this blend. The data in Table III shows

COMPARISON EXAMPLE 12

877 grams of isotactic PP having an MFR of 32.0 and 375 grams of an EPC having an $M_L$ (1+8, 127° C.) of 28 and an ethylene content of 55 wt. % were mixed in a Banbury in the manner described in Example 9. Izod and tensile testing were performed as in Example 9, except that unnotched specimens were tested at −18° C. The flexural modulus (ASTM D790I) and knit-line tensile strength (ASTM D638 test on a double-gated, injection molded sample) were also measured. Notched Izod at room temperature and unnotched Izod at −30° C. show significantly lower values.

EXAMPLE 13

788 grams of the maleated PP of Example 12, 338 grams of the EPC of Example 12, 188 grams of isotactic PP maleated with 0.20 wt. % maleic anhydride and having an MFR of 150.0, and 38 grams of a functionalized EPC having an $M_L$ (1+8, 127° C.) of 31, an ethylene content of 56 wt. % and 12.2 meq/100 gms of polymer of the polar functional group —NH(C$_4$H$_9$) were mixed and tested as in Example 12. The data in Table III again shows the advantages of compatibilization from the graft copolymers made by the in situ reaction of maleated PP and functionalized EPC. Comparing with Example 12, domain sizes are reduced by a factor of 10 and impact strength at −18° C. has doubled. A doubling in knit-line tensile strength is also seen.

COMPARISON EXAMPLE 14

4,194 grams of isotactic polypropylene having an MFR of 4.0 and 1,806 grams of an EPC having a $M_L$ (1+8, 127° C.) of 30 and an ethylene content of 44 wt. % were mixed in an extruder as in Example 8. It was then tested in the manner described in Example 9.

EXAMPLE 15

3,900 grams of the isotactic PP of Example 14, 1,500 grams of the EPC of Example 14, and 600 grams of the graft copolymer composition prepared in accordance with Example 8 were blended and tested as in Example 14. The data again shows the advantages of compatibilization by the graft copolymer of the invention, here by the addition of a preformed graft polymer. Again, the compatibilized blend shows smaller phase sizes and higher impact strength at room temperature and low temperature (0° C.), without significant loss of other properties.

COMPARISON EXAMPLE 16

5,118 grams of the isotactic PP of Example 14 and 882 grams of the EPC of Example 14 were mixed and tested as in Example 14.

EXAMPLE 17

4,800 grams of the isotactic PP of Example 14, 600 grams of the EPC of Example 14 and 600 grams of the graft copolymer composition prepared in accordance with Example 8 were mixed in an extruder and tested as in Example 14. Compatibilization is again seen in the reduction in phase domain size and increase in low temperature impact strength.

acts as a steric stabilizer during the processing of the blend.

A number of the physical properties of these blends show the utility of compatibilization. It is well known that the size of rubber particles (morphology) dispersed in a plastic control its impact strength, and that, in general, a simple physical blend of PP and EPC results in domain sizes that are larger than optimum (e.g., "Toughening of Plastics", C. B. Bucknall and W. W. Stevens, Plastics & Rubber Institute, London, 1978). This is particularly true at low temperatures, i.e., below the glass transition temperature of the particular matrix PP. Further, it has been suggested that for two-phase polymer blend systems the smaller the particle size of the dispersed phase, so long as it remains above a lower limit on the order of about 0.01 micron, the greater will be impact improvement, see, "Two Phase Polymer Systems", S. L. Rosen, Polymer Engineering and Science, (April, 1967). As also stated therein, the presence of polar monomers helps to achieve compatibility or adhesion between the phases. Thus, the large enhancement of the impact strength of the compatibilized blends (Examples 10, 13, 15 and 17) compared with the

TABLE III

|  | Example | | | | | | | | |
|---|---|---|---|---|---|---|---|---|---|
|  | 9 | 10 | 11 | 12 | 13 | 14 | 15 | 16 | 17 |
| Composition (g) | | | | | | | | | |
| PP | 200 | 180 | 180 | — | — | — | — | — | — |
| PP | — | — | — | 877 | 788 | — | — | — | — |
| PP | — | — | — | — | — | 4194 | 3900 | 5118 | 4800 |
| EPC | 50 | 45 | 45 | — | — | — | — | — | — |
| EPC | — | — | — | 375 | 338 | — | — | — | — |
| EPC | — | — | — | — | — | 1806 | 1500 | 882 | 600 |
| Maleated PP | — | 20 | — | — | — | — | — | — | — |
| Maleated PP, | — | — | — | — | 88 | — | — | — | — |
| Functionalized EPC | — | 5 | — | — | — | — | — | — | — |
| Functionalized EPC | — | — | — | — | 38 | — | — | — | — |
| "Block Copolymer" | — | — | 25 | — | — | — | — | — | — |
| Example 8 | — | — | — | — | — | — | 600 | — | 600 |
| Total EP Content (wt. %) | 20 | 20 | 20 | 30 | 30 | 30 | 30 | 15 | 15 |
| Percent Functional Components | 0 | 10 | 0 | 0 | 10 | 0 | 10 | 0 | 10 |
| Mixing Method | Banbury | Banbury | Banbury | Banbury | Banbury | Extruder | Extruder | Extruder | Extruder |
| Domain Size (micron) | 0.25–1.0 | 0.1–0.5 | 1.0–2.0 | 2.0–20.0 | 0.3–2.0 | 1.0–2.0 | 0.3–1.0 | 0.7–1.5 | 0.1–0.5 |
| Izod Impact Strength (Ft-lb/in) | | | | | | | | | |
| 21° C. notched | 12.3 | 16.1 | 11.3 | 2.0 | 3.2 | 8.8 | 11.1 | 1.8 | 1.9 |
| 0° C., notched | — | — | — | — | — | 1.7 | 6.0 | 0.7 | 0.8 |
| −10° C., notched | — | — | — | — | — | 1.1 | 1.1 | — | — |
| −18° C., notched | 0.8 | 2.6 | 1.1 | — | — | — | — | — | — |
| −18° C., unnotched | — | — | — | 15.0 | 34.9 | — | — | — | — |
| −30° C., unnotched | 25.2 | 35.1 | 24.2 | 15.3 | 24.6 | — | — | — | — |
| Tensile Properties | | | | | | | | | |
| Young's Modulus (kpsi) | 59.6 | 52.5 | — | — | — | — | — | — | — |
| Flexural Modulus (kpsi) | — | — | — | 83.2 | 83.9 | — | — | — | — |
| Stress at Break (kpsi) | 2.70 | 3.24 | — | 3.26 | 3.17 | 2.63 | 2.55 | 2.76 | 2.74 |
| Elongation at Break (%) | 52.5 | 557 | — | 55.3 | 19.6 | 379 | 371 | 47 | 41 |
| Knit-Line Tensile Strength (psi) | — | — | — | 621 | 1243 | — | — | — | — |

The most direct way to show that the addition of a certain polymer to a blend enhances its compatibility is to show that the domain size of the dispersed phase in the blend is reduced by the addition of the compatibilizer. In the examples given here (#9–17), this was shown using the SEM procedures described above. The fact that the blends which contain a portion of the graft polymer of this invention have much smaller dispersed phase domain size than the corresponding unmodified blends proves that compatibilization has occurred. This is most likely due to two causes: a thermodynamic one, in that the interfacial tension is reduced by the compatibilizer, and a kinetic one, in that the graft polymer unmodified analogues (Examples 9, 12, 14 and 16) is a direct consequence of the morphological and compatibility change as described above.

Most other physical properties are unaffected by compatibilization as can be seen in Examples 9 to 17. Some are improved as in the knit line tensile strength seen in Examples 12 and 13, and this is presumably also due to morphology control by compatibilization.

Although the invention has been described with reference to particular means, materials and embodiments it is to be understood that the invention is not limited to the particulars disclosed and extends to all equivalents within the scope of the claims.

What is claimed is:

1. A graft copolymer composition comprising a functionalized substantially amorphous ethylene-alpha-olefin copolymer having isotactic polypropylene grafted thereto through one or more functional linkages formed from the reaction of functional groups on the ethylene-alpha-olefin copolymer with maleic moieties on the polypropylene.

2. The composition of claim 1 wherein said functional groups are selected from the group consisting of hydroxy, primary amino, and secondary amino.

3. The composition of claim 2 wherein said functionalized ethylene-alpha-olefin copolymer additionally comprises at least one diene monomer.

4. The composition of claim 1 wherein said ethylene-alpha-olefin copolymer has a degree of crystallinity less than 25% and a molecular weight between about 5,000 and 1,000,000.

5. The composition of claim 4 wherein said molecular weight is between 15,000 and 350,000.

6. The composition according to claim 3 wherein said diene monomer is one or more diene monomers selected from the group consisting of 5-methylene-2-norbornene, 5-ethylidene-2-norbornene, 1,4-hexadiene and dicyclopentadiene.

7. The composition according to claim 1 wherein said ethylene-alpha-olefin copolymer contains 0 to 3 wt. % of at least one diene monomer.

8. The composition according to claim 1 wherein said isotactic polypropylene has a molecular weight between about 10,000 to about 10,000,000.

9. The composition according to claim 1 wherein said isotactic polypropylene has a molecular weight between about 50,000 to about 300,000.

10. The composition of claim 2 wherein said functional group is hydroxy.

* * * * *